(12) United States Patent
Klett

(10) Patent No.: US 6,398,994 B1
(45) Date of Patent: Jun. 4, 2002

(54) METHOD OF CASTING PITCH BASED FOAM

(75) Inventor: James W. Klett, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/400,634

(22) Filed: Sep. 21, 1999

(51) Int. Cl.$^7$ ............................................... B29C 67/20
(52) U.S. Cl. ........................ 264/42; 264/29.6; 264/102; 423/445 R
(58) Field of Search ........................ 264/42, 102, 29.6; 423/445 R

(56) References Cited

U.S. PATENT DOCUMENTS

| | | | | |
|---|---|---|---|---|
| 3,914,392 A | * | 10/1975 | Klett | 428/408 |
| 3,954,544 A | * | 5/1976 | Hooker | 156/79 |
| 4,137,198 A | * | 1/1979 | Sachs | 521/154 |
| 4,276,246 A | * | 6/1981 | Bonzom et al. | 264/54 |
| 5,965,626 A | * | 10/1999 | Tzeng et al. | 521/101 |
| 6,033,506 A | * | 3/2000 | Klett | 264/42 |
| 6,077,464 A | * | 6/2000 | Murdie et al. | 264/29.5 |

* cited by examiner

*Primary Examiner*—Allan R. Kuhns
(74) *Attorney, Agent, or Firm*—Akerman, Senterfitt & Eidson, P.A.

(57) ABSTRACT

A process for producing molded pitch based foam is disclosed which minimizes cracking. The process includes forming a viscous pitch foam in a container, and then transferring the viscous pitch foam from the container into a mold. The viscous pitch foam in the mold is hardened to provide a carbon foam having a relatively uniform distribution of pore sizes and a highly aligned graphic structure in the struts.

13 Claims, 4 Drawing Sheets

Figure 1. Foam columns which overflowed beaker during foaming.

Figure 3. Foaming vessel and casting of foam after removing from furnace

Figure 4. Casting of foam removed from receiving Mold

METHOD OF CASTING PITCH BASED FOAM

STATEMENT REGARDING FEDERALLY SPONSORED RESEARCH OR DEVELOPMENT

The United States Government has rights in this invention pursuant to contract No. DE-AC05-96OR22464 between the United States Department of Energy and Lockheed Martin Energy Research Corporation.

CROSS-REFERENCE TO RELATED APPLICATIONS

Not Applicable

BACKGROUND OF THE INVENTION

The present invention relates to carbon foam, and more particularly to a process and apparatus for extruding a thermally conductive carbon foam.

The extraordinary mechanical properties of commercial carbon fibers are due to the unique graphitic morphology of the extruded filaments. See Edie, D. D., "Pitch and Mesophase Fibers," in *Carbon Fibers, Filaments and Composites*, Figueiredo (editor, Kluwer Academic Publishers, Boston, pp. 43–72 (1990). Contemporary advanced structural composites exploit these properties by creating a disconnected network of graphitic filaments held together by an appropriate matrix. Carbon foam derived from a pitch precursor can be considered to be an interconnected network of ligaments or struts. As such interconnected networks, they would represent a potential alternative as a reinforcement in structural composite materials.

Recent developments of fiber-reinforced composites has been driven by requirements for improved strength, stiffness, creep resistance, and toughness in structural engineering materials. Carbon fibers have led to significant advancements in these properties in composites of various polymeric, metal, and ceramic matrices.

However, current applications of carbon fibers has evolved from structural reinforcement to thermal management in application ranging from high density electronic modules to communication satellites. This has stimulated research into novel reinforcements and composite processing methods. High thermal conductivity, low weight, and low coefficient of thermal expansion are the primary concerns in thermal management applications. See Shih, Wei, "Development of Carbon-Carbon Composites for Electronic Thermal Management Applications," IDA Workshop, May 3–5, 1994, supported by AF Wright Laboratory under Contract Number F33615-93-C-2363 and AR Phillips Laboratory Contract Number F29601-93-C-0165 and Engle, G. B., "High Thermal Conductivity C/C Composites for Thermal Management," IDA Workshop, May 3–5, 1994, supported by AF Wright Laboratory under Contract F33615-93-C-2363 and AR Phillips Laboratory Contract Number F29601-93-C-0165. Such applications are striving towards a sandwich type approach in which a low density structural core material (i.e. honeycomb or foam) is sandwiched between a high thermal conductivity facesheet.

Structural cores are limited to low density materials to ensure that the weight limits are not exceeded. Unfortunately, carbon foams and carbon honeycomb materials are the only available materials for use in high temperature applications (>160° C.). High thermal conductivity carbon honeycomb materials are extremely expensive to manufacture compared to low conductivity honeycombs, therefore, a performance penalty is paid for low cost materials.

Typical foaming processes utilize a "blowing" technique to produce a foam of the pitch precursor. The pitch is melted and pressurized, and then the pressure is reduced. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," *Mat. Res. Soc. Symp.*, Materials Research Society, 270:29–34 (1992), Hagar, Joseph W. and Max L. Lake, "Formulation of a Mathematical Process Model Process Model for the Foaming of a Mesophase Carbon Precursor," *Mat. Res. Soc. Symp.*, Materials Research Society, 270:35–40 (1992), Gibson, L. J. and M. F. Ashby, *Cellular Solids: Structures & Properties*, Pergamon Press, New York (1988), Gibson, L. J., Mat. Sci. and Eng A110, 1 (1989), Knippenberg and B. Lersmacher, Phillips Tech. Rev., 36(4), (1976), and Bonzom, A., P. Crepaux and E. J. Moutard, U.S. Pat. No. 4,276,246, (1981). Additives can be added to promote, or catalyze, the foaming, such as dissolved gases (like carbon dioxide, or nitrogen), talc powder, freons, or other standard blowing agents used in making polymer foams.

Then, unlike polymer foams, the pitch foam must be oxidatively stabilized by heating in air (or oxygen) for many hours, thereby, cross-linking the structure and "setting" the pitch so it does not melt, and deform the structure, during carbonization. See Hagar, Joseph W. and Max L. Lake, "Formulation of a Mathematical Process Model Process Model for the Foaming of a Mesophase Carbon Precursor, *Mat. Res. Soc. Symp.*, Materials Research Society, 270:35–40 (1992) and White, J. L., and P. M. Shaeffer, *Carbon*, 27:697 (1989). This is a time consuming step and can be an expensive step depending on the part size and equipment required.

Next, the "set" or oxidized pitch foam is then carbonized in an inert atmosphere to temperatures as high as 1100° C. Then, a final heat treatment can be performed at temperatures as high as 3000° C. to fully convert the structure to carbon and produce a carbon foam suitable for structural reinforcement. However, these foams as just described exhibit low thermal conductivities.

Other techniques may utilize a polymeric precursor, such as phenolic, urethane, or blends of these with pitch. See Hagar, Joseph W. and Max L. Lake, "Idealized Strut Geometries for Open-Celled Foams," *Mat. Res. Soc. Symp.*, Materials Research Society 270:41–46 (1992), Aubert, J. W., (MRS Symposium Proceedings, 207:117–127 (1990), Cowlard, F. C. and J. C. Lewis, *J. of Mat. Sci.*, 2:507–512 (1967) and Noda, T., Inagaki and S. Yamada, J. of Non-Crystalline Solids, 1:285–302, (1969). However, these precursors produce a "glassy" or vitreous carbon which does not exhibit graphitic structure and, thus, has a very low thermal conductivity and low stiffness as well. See Hagar, Joseph W. and Max L. Lake, "Idealized Strut Geometries for Open-Celled Foams," *Mat. Res. Soc. Symp.*, Materials Research Society, 270:41–46 (1992).

One technique developed by the inventor of the present invention, and is fully disclosed in commonly assigned U.S. patent application Ser. No. 08/921,875. It overcomes these limitations, by not requiring a "blowing" or "pressure release" technique to produce the foam. Furthermore, an oxidation stabilization step is not required, as in other methods used to produce pitch-based carbon. This process is less time consuming, and therefore, will be lower in cost and easier to fabricate than the prior art above. More importantly, this process is unique in that it produces carbon foams with high thermal conductivities, greater than 58 W/m·K.

The method described in U.S. patent application Ser. No. 08/921,875 can experience mold release problems when certain molds are used. For example, if a thick aluminum, steel, or graphite mold is used, the foam will crack in what appears to be tension failures at locations that were in contact with the mold prior to foaming. Thus a mold release is required, which can alter the final dimensions of the molded article, and require further processing, such as machining.

SUMMARY OF THE INVENTION

The invention described herein provides a method of casting a pitch based. The method includes forming a viscous pitch foam in a container. Transferring the viscous pitch foam from the container into a mold, and then hardening the viscous pitch foam to form a molded pitch based foam.

The general objective of the present invention is to provide a method of casting carbon foam without cracking caused by contacting the pitch to the mold prior to foaming. This objective is accomplishing by transferring the viscous pitch foam in the mold, and then hardening the viscous pitch foam to form a pitch derived foam. The pitch derived foam hardens in the mold without cracking because only the viscous pitch foam contacts the mold, and not the melted pitch.

Another objective of the present invention is to provide a method of casting carbon foam that does not require a mold release in the mold. This objective is accomplished by transferring the foamed pitch into the mold.

These and other objectives are accomplished by a method of casting a pitch based foam which includes the steps of: forming a viscous pitch foam in a container; transferring the viscous pitch foam from the container into a mold; and hardening the viscous pitch foam to form a cast pitch derived foam.

BRIEF DESCRIPTION OF THE DRAWINGS

FIG. 3 is a photograph of molded carbon foam formed using the apparatus of FIG. 2; and FIG. 4 is a photograph of molded carbon foam separated from the mold.

DETAILED DESCRIPTION OF THE INVENTION

Figure 1:
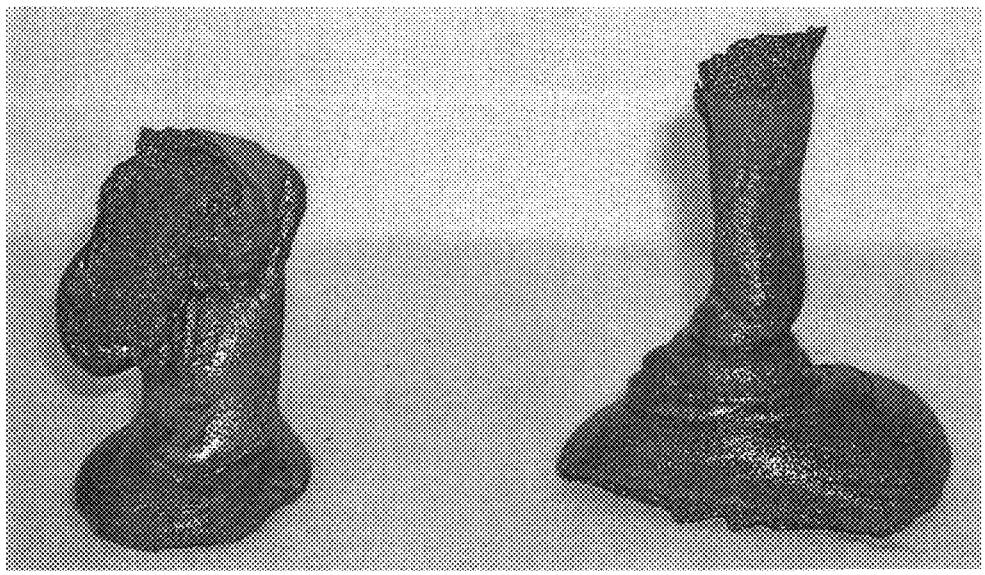
FIG. 1 is a photograph of foam formed using an embodiment of the present invention which does not exhibit cracks.

A pitch based foam, such as fully disclosed in U.S. patent application Ser. No. 08/921,875, which teachings are fully incorporated herein by reference, is formed by transferring a viscous pitch foam, such as derived from a mesophase or isotropic pitch (herein referred to as pitch), into a mold prior to coking. The foam precursor does not form cracks in the coked foam when in contact with the mold.

The viscous pitch foam can be formed by placing pitch powder, granules, or pellets in a container. These pitch materials can be solvated if desired. The sample is heated in a substantially oxygen-free environment to avoid oxidation of the pitch materials during heating. Preferably, the pitch is heated in a furnace which has been evacuated to less than 1 torr. Alternatively, the pitch is heated under a blanket of inert gas, such as nitrogen, to avoid oxidation of the pitch. The pitch is heated to a temperature approximately 50 to 100° C. above the softening point. For example, where Mitsubishi ARA24 mesophase pitch is used, a temperature of 300° C. is sufficient.

Once the pitch is melted, if it is heated in a vacuum, the vacuum is released to a nitrogen blanket. The pressure inside the furnace is then increased up to about 400 psi to 1000 psi (preferably 1000 psi), and the temperature of the system is then raised to cause the evolution of pyrolysis gases to form the viscous pitch foam. This viscous pitch foam is still fluid and will flow. However, the viscosity of the foam is dependent on the temperature and, in general, as the temperature is increased, the viscosity will decrease, making it easier to flow. The preferred operating temperature will be dependent on the precursor pitch. The preferred foaming temperature for ARA24 mesophase pitch is between 420° C. and 480° C. and most preferably at about 450° C.

The foam precursor is then transferred from the container, such as by pouring, into a mold having the desired final shape of foam. The temperature inside the furnace is then raised to a temperature sufficient to coke the pitch which is about 500° C. to 1000° C. This is performed preferably at a rate about 2° C./min. This heating rate will be strongly dependent on size and shape, to minimize thermal shock damage. Preferably, the temperature inside the furnace is held for at least 15 minutes to achieve an assured soak and an isothermal system.

Once the pitch derived foam inside the mold is formed (coked), it may be cooled to room temperature. Preferably the foam is cooled at a rate of approximately 1.5° C./min and, again, will be size dependent. During the cooling cycle, pressure is released gradually to atmospheric conditions. Preferably, the pressure inside the furnace is released at a rate of approximately 2 psi/min. The molded pitch derived foam is then separated from the mold.

The cast pitch derived foam can be post heat treated to temperatures above 2000° C. for conversion to a graphitic structure (depending on pitch precursor). In general mesophase pitches graphitize significantly easier than isotropic pitches (coal derived or petroleum derived). The more graphitic the material, the higher the thermal conductivity of the resulting graphitic foam.

Carbon foam produced with this technique exhibits similar properties as the carbon foam disclosed in U.S. patent application Ser. No. 08/921,875. However, when the coked foam is removed from the mold, the final product of the present invention does not exhibit cracking, as shown in the following examples. Thus, a mold release to prevent the pitch from contacting the mold is not necessarily required. Although a mold release is not necessarily required, a mold release can be used without departing from the scope of the present invention.

The foam can be further processed to provide additional properties, such as by densifying the foam. For example, the molded foam can be heat treated to 1050° C. (carbonized) under an inert gas (nitrogen), and then heat treated in separate runs to 2500° C. and 2800° C. (graphitized) in an inert gas (i.e. Argon) to provide a carbon foam having high thermal conductivity (up to 187 W/mk) and a density of only 0.6 g/cc. Also, the graphitic foam may exhibit thermal conductivities of about 50 W/m·K at a density of about 0.2 g/cc. If the heat treatment is below 2000° C., the carbon foam will most likely be thermally insulating (<10 W/mK) and a poor conductor of heat. The operating pressure during foaming will basically control the final density of the foam. All of the foams regardless of heat treatment are considered pitch based foams.

EXAMPLE I

A 250 ml container was filled with Mitsubishi ARA24 pitch in the form of pellets. The container was then placed in a furnace, evacuated to 200 millitorr and back filled with nitrogen. The pitch was heated to a temperature of approximately 300 C in order to soften (melt) the pitch. The pressure inside the furnace was then increased to approximately 68 atm (1000 psi), and the temperature inside the furnace was increased to approximately 450C. The increased temperature caused the formation of pyrolysis gases in the melted pitch. The pyrolysis gasses causes the melted pitch to foam creating the viscous pitch foam. In this example, the foam overflowed out of the container forming a column and collecting on the furnace shelf. Following, the temperature in the furnace was increase to 630° C. to coke the foam.

As shown in FIG. 1, the resulting overflowed foam was stable and substantially homogeneous with the exception of flow patterns. The flow patterns, however, can be easily controlled during processing. The overflow (poured) foam did not exhibit cracks, such as formed by foaming and casting the pitch precursor in the same container.

EXAMPLE II

Figure 2:
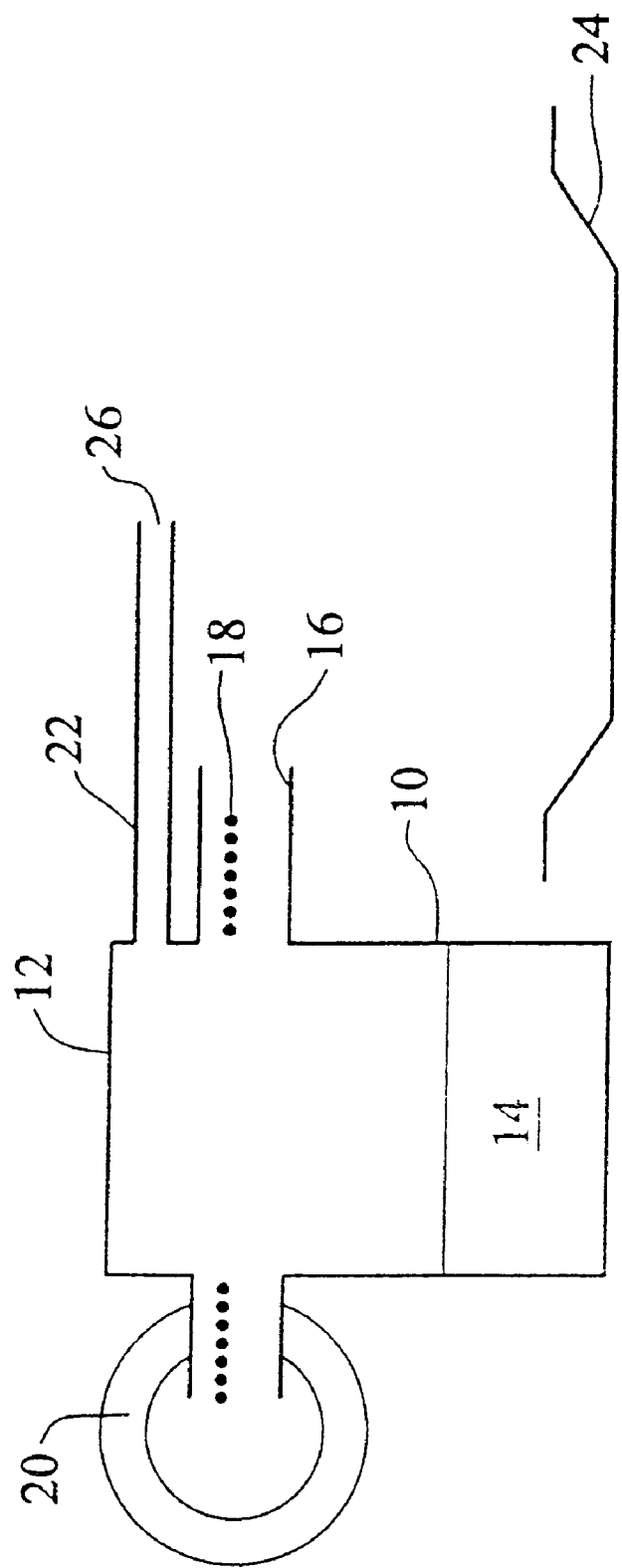
FIG. 2 is a schematic of an apparatus for casting carbon foam incorporating the present invention.

Referring to FIGS. 2 and 3, a crucible 10 with a lid 12 is used to foam the pitch, and form the viscous pitch foam. Pitch 14 is placed in the crucible 10, and the lid 12 is secured to the crucible top 16. A ringed Grafoil gasket material 18 is clamped between the lid 12 and crucible 10 using graphite clamps 20 to provide a tight seal. A tube 22 extends from the lid 12.

A viscous pitch foam was formed in the crucible 10, as in Example I. As the pitch 14 foamed in the crucible 10 to form the viscous pitch foam, the expanding foam forced its way through the tube 22, out of the crucible 10, and into a 20 mold 24 disposed beneath the tube outlet 26.

As can be seen in FIG. 4, the foam took on the shape of the mold 26, without the cracks, such as formed by foaming and casting the pitch precursor in the same container.

It will thus be seen that the present invention provides for the manufacture of cast pitch-based foam or pitch based carbon foam which does not exhibit cracks. The process involves the fabrication of a graphitic foam from a mesophase or isotropic pitch which can be synthetic, petroleum, or coal-tar based. A blend of these pitches can also be employed. The foam is molded by transferring the viscous pitch foam formed in a container to a mold having a desired shape to avoid cracking caused by casting the carbon foam in the same container in which the viscous pitch foam is formed.

Preferably, the foam can have a relatively uniform distribution of pore sizes (average between 50 and 500 microns), very little closed porosity, and a density ranging from approximately 0.20 g/cm$^3$ to 0.7 g/cm$^3$. However, deviations from this preferable properties are possible by changing the operating conditions and the pitch precursor. When a mesophase pitch is used, the domains are stretched along the struts (or cell walls) of the foam structure and thereby produces a highly aligned graphitic structure parallel to the cell walls (or struts). When graphitized, these struts will exhibit thermal conductivities similar to the very expensive high performance carbon fibers (such as P-120 and K1100). Thus, the foam will exhibit high thermal conductivity at a very low density (>0.5 g/cc). By utilizing an isotropic pitch, the resulting foam can be easily activated to produce a high surface area activated carbon. Also, isotropic pitches will typically results in stronger materials, especially if derived from coals.

While there has been shown and described a preferred embodiment of the invention, it will be obvious to those skilled in the art that various changes and modifications can be made therein without departing from the scope of the invention defined by the appended claims.

What is claimed is:

1. A method of casting a pitch based foam comprising the steps of:

heating a pitch material to melt said pitch material;

forming a viscous pitch foam from the melted pitch in a container;

transferring said viscous pitch foam from said container into a mold; and hardening said viscous pitch foam to form a cast pitch based foam.

2. The method of claim 1 including the step of separating said cast pitch based foam from said mold.

3. The method of claim 1, in which said pitch based foam is subjected to a temperature sufficient to form a carbon foam.

4. The method of claim 1, in which said pitch based foam is subjected to a temperature sufficient to form a graphitic foam.

5. The process of claim 1 in which the viscous pitch foam is heated in the mold to a temperature in the range of about 500° C. to about 1000° C. to harden the viscous pitch foam.

6. The process of claim 1 further including the step of densifying the foam.

7. The method of claim 1, wherein said viscous pitch foam is a single phase liquid.

8. The method of claim 1, wherein said pitch material is at least one selected from the group consisting of isotropic and mesophase pitch.

9. A method of casting a pitch based foam comprising the steps of:

forming a viscous pitch foam in a container, said forming step including the steps of placing said pitch into said container; melting said pitch in a substantially oxygen free environment; subjecting said melted pitch to a pressure and heating said pressurized melted pitch to cause evolution of gases;

transferring said viscous pitch foam from said container into a mold; and hardening said viscous pitch foam to form a cast pitch based foam.

10. The process of claim 9 in which the substantially oxygen-free environment is provided by a vacuum step.

11. The process of claim 10 in which the vacuum is applied at less than 1 torr.

12. The process of claim 9 in which the substantially oxygen-free environment is provided by covering the pitch with an inert fluid.

13. The process of claim 12 in which nitrogen is introduced as the inert fluid.

* * * * *